(12) United States Patent
Dominelli et al.

(10) Patent No.: US 6,217,634 B1
(45) Date of Patent: Apr. 17, 2001

(54) APPARATUS AND METHOD FOR MONITORING AND PURIFYING DIELECTRIC FLUIDS

(75) Inventors: Nicola Dominelli, Surrey; David R. Pugh, Vancouver; Gordon R. Ashby; David Casson, both of Surrey, all of (CA)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/384,732

(22) Filed: Aug. 27, 1999

(51) Int. Cl.[7] .................................................. B01D 19/00
(52) U.S. Cl. .................. 95/46; 96/6; 174/14 R; 336/58
(58) Field of Search ................. 95/46; 96/6; 174/14 R, 174/15.1; 336/57, 58, 59, 94

(56) References Cited

U.S. PATENT DOCUMENTS

| | | | |
|---|---|---|---|
| 3,591,946 | * 7/1971 | Loe | 96/193 |
| 3,675,395 | * 7/1972 | Baranowski | 96/193 |
| 3,726,063 | * 4/1973 | Magorien et al. | 96/193 |
| 3,894,171 | * 7/1975 | Kusay | 174/14 R |
| 3,934,453 | * 1/1976 | Hessen | 174/14 R |
| 3,989,102 | * 11/1976 | Jaster et al. | 174/15.1 |
| 4,089,662 | * 5/1978 | Williams | 96/193 |
| 4,236,484 | * 12/1980 | Lapp et al. | 96/193 |
| 4,336,414 | * 6/1982 | Suzuki et al. | 174/14 R |
| 4,394,635 | * 7/1983 | Foss | 174/15.1 |
| 4,437,082 | 3/1984 | Walsh et al. | 336/58 |
| 4,561,866 | * 12/1985 | Altmann et al. | 96/193 |
| 4,986,837 | 1/1991 | Shibata | 55/190 |
| 5,211,856 | * 5/1993 | Shen | 96/193 |
| 5,914,154 | 6/1999 | Nemser | 427/245 |
| 5,976,226 | * 11/1999 | Bastian et al. | 96/6 |

FOREIGN PATENT DOCUMENTS

| | | | |
|---|---|---|---|
| 56-76205 | * 6/1981 | (JP) | 96/6 |
| 2-115003 | * 4/1990 | (JP) | 96/6 |

* cited by examiner

*Primary Examiner*—Duane S. Smith
(74) *Attorney, Agent, or Firm*—Pennie & Edmonds LLP

(57) ABSTRACT

The present invention monitors and removes contaminants from dielectric fluids by utilizing an apparatus having a chamber and tube configuration. The chamber encloses a plurality of tubes which include porous hollow fibers with an inert polymer coating. Conduits route the dielectric fluid to and from operative equipment. An atmosphere control device creates an atmospheric condition within the chamber that causes contaminants within the dielectric fluid to migrate through the tubes into the chamber, thereby producing refined dielectric fluid. The method of the present invention removes contaminants from a dielectric fluid. The dielectric fluid is routed from operative equipment and passes through tubes enclosed within a chamber. An atmospheric condition is created within the chamber to cause contaminants within the dielectric fluid to migrate into the chamber. A refined dielectric fluid is produced which is directed back to the operative equipment. The contaminants removed from the dielectric fluid may further be analyzed, monitored, have any moisture therein removed, or be vented to atmosphere.

18 Claims, 5 Drawing Sheets

APPARATUS AND METHOD FOR MONITORING AND PURIFYING DIELECTRIC FLUIDS

TECHNICAL FIELD

The present invention relates generally to operative equipment that uses a dielectric fluid. More particularly, the invention relates to the monitoring and purification of a dielectric fluid in such equipment.

BACKGROUND OF THE INVENTION

Many types of mechanical and electrical operative equipment contain a dielectric fluid for dissipating heat generated by energized components, and/or for insulating components from one another or from the operative equipment enclosure. Examples of such operative equipment include various types of electrical equipment such as transformers, capacitors, switches, and load tap changers. Dielectric fluids used in operative equipment typically comprise blends of compounds in the group including: paraffinic, naphthenic, and other organic fluids such as polyalphaolefins, esters, and natural vegetable oils.

Large electrical transformers generally rely upon dielectric fluids such as transformer oil, for the purpose of cooling and insulating transformer components. Over time, components within the transformer, such as insulating paper or the dielectric fluid itself, degrade. Also, if the transformer overheats or malfunctions, the dielectric fluid may further degrade. These degrading conditions cause contaminants such as gases, moisture and other volatile compounds to be diffused into the dielectric fluid. The volatile compounds may include a host of products, including products originating from the decomposition of insulating paper or its additives. As a result, the dielectric fluid's insulating and cooling properties are altered, thereby diminishing the transformer's efficiency and promoting transformer failure. In general, the dielectric fluid's and solid insulation's properties degrade more rapidly in the presence of dissolved moisture and oxygen, which may ingress through gaskets, seals or oil expansion systems from the atmosphere or as a result of solid decomposition.

To maintain ideal dielectric fluid properties, any impurities present in a dielectric fluid need to be removed periodically. Typically, removal of dissolved gases, moisture and volatile compounds from dielectric fluid is accomplished by applying a combination of a vacuum and heat to the dielectric fluid. Applying a vacuum to the dielectric fluid while a transformer is in use can generate bubbles and put the transformer at risk by compromising its dielectric integrity. A transformer therefore is usually removed from service in order to purify the dielectric fluid. In most cases, the oil is degassed, dehydrated, and purified using a combination of vacuum and fuller's earth processes in external oil processing equipment and by recirculating the oil within the transformer tank.

Separation of dissolved gases from insulating oils has been accomplished in the prior art by permeation through thin wall tubing. This has however proved to be too slow for on-line degassing, moisture removal or near real time monitoring of dissolved gases in transformers oils.

U.S. Pat. No. 4,437,082 discloses a means of continually upgrading transformer oil by passing the oil through a series of filters. A degassing filter uses a permeable membrane of polymeric material to filter low molecular weight gases from the oil. This design utilizes a flat membrane structure which does not remove a satisfactory amount of gas from the oil because the surface area of oil exposed to the gas removing membrane is not optimal.

U.S. Pat. No. 5,914,154 discloses a process for making a gas permeable membrane and filter for purifying a gas. A gas containing impurities, such as oil droplets, is purified by trapping the impurities on one side of the membrane while recovering the desired purified gas from the other side of the membrane. This apparatus does not address degassification of fluids.

There are several products commercially available for degassing water or removal of organic compounds from water using porous hollow fibers. These products, however, are not compatible with insulating oils. U.S. Pat. No. 4,986,837 discloses an apparatus for degassing a liquid such as water or the like, using a semi-porous filter. This apparatus is however unsuitable for degassing dielectric fluids.

It is well known in the art to monitor the contents of dielectric fluid by sampling of gas or dielectric fluids for laboratory analysis. If the contaminants present within the dielectric fluid could be separated from the fluid and independently analyzed, such an analysis would lead to a more accurate determination of the overall condition of the transformer. Such an analysis would also facilitate in situ analysis and continuous on-line monitoring of gases, moisture and volatile compounds indicative of incipient dielectric failure or excessive overheating of insulating components.

In view of the foregoing, it would be highly desirable to provide an apparatus and method for continuously monitoring and purifying a dielectric fluid while it is in use by operative equipment.

SUMMARY OF THE INVENTION

According to the invention there is provided an apparatus for removing contaminants from a dielectric fluid, such as transformer oil. The dielectric fluid is enclosed by operative equipment, such as an electrical transformer. The apparatus comprises a chamber enclosing a plurality of tubes. Each tube includes a porous hollow fiber coated with an inert polymer. A first conduit routes the dielectric fluid to the chamber. An atmosphere control device creates an atmospheric condition within the chamber which causes contaminants within the dielectric fluid to migrate through the tubes into the chamber, thereby producing refined dielectric fluid. A second conduit routes the refined dielectric fluid from the tubes back to the operative equipment.

According to the invention there is further provided a method of removing contaminants from operative equipment that relies upon a dielectric fluid. The method comprises routing the dielectric fluid from the operative equipment and passing the dielectric fluid through a plurality of tubes enclosed with a chamber. Each tube includes a porous hollow fiber coated with an inert polymer. An atmospheric condition is created within the chamber to force contaminants within the dielectric fluid to migrate through the tubes into the chamber. A refined dielectric fluid is thereby produced which is directed back to the operative equipment. The contaminants removed from the dielectric fluid may further be analyzed, monitored, have any moisture therein removed, or be vented to atmosphere.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE DRAWINGS

Figure 1:
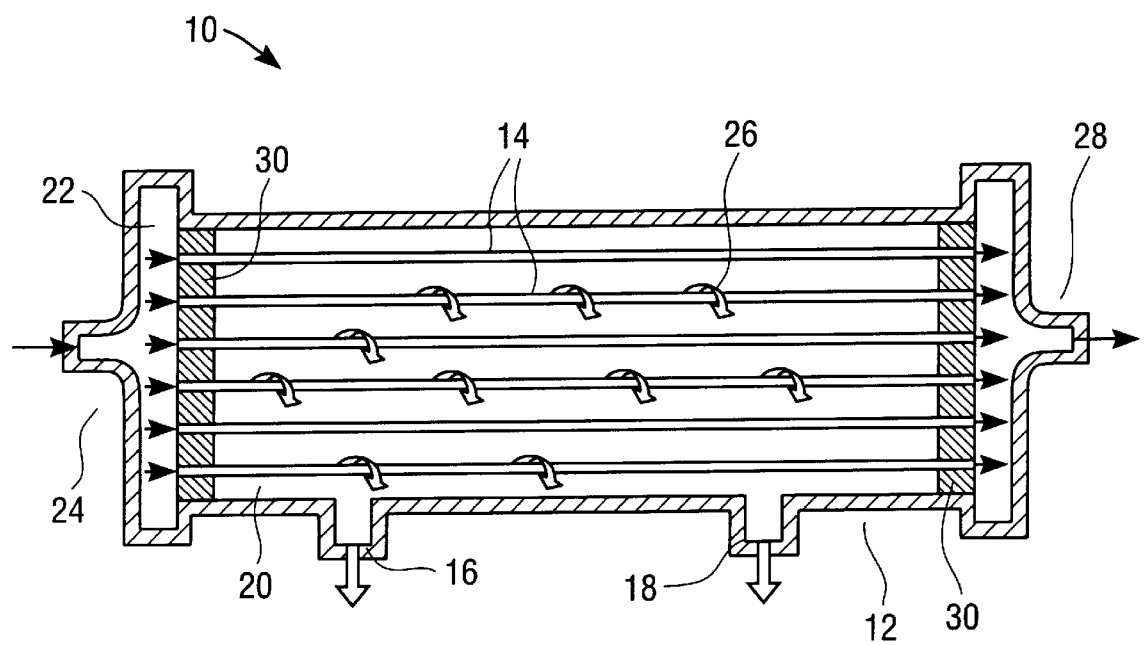
FIG. 1 illustrates a filtration apparatus in accordance with the invention.

FIG. 1 illustrates a dielectric fluid filtration apparatus 10. The filtration apparatus 10 consists of a chamber 12 through which a plurality of tubes 14 extend. Each tube 14 comprises a composite hollow fiber coated with a thin layer of a non-porous gas permeable polymer, thus making each tube 14 gas, but not dielectric fluid permeable. The chamber 12, is hermetically sealed, except for inlet port 16 and outlet port 18. The interior of the tubes 14 define a tube side 22 and the exterior of the tubes, bounded by the chamber 12, define a shell side 20. Dielectric fluid (not shown) containing entrained or dissolved contaminants is introduced into the filtering apparatus 10 at a fluid inlet 24 on the tube side 22 of the filtering apparatus 10. As used herein, the term "contaminants" includes gas, moisture and/or volatile compounds. An atmospheric condition is created on the shell side 20 of the filtering apparatus 10. Such an atmospheric condition may be created by applying a vacuum to ports 16 and 18. As indicated by reference numeral 26, the contaminants dissolved in the dielectric fluid migrate through the tube walls, into the shell side 20. Purified dielectric fluid then exits the filtration apparatus 10 at fluid outlet 28. A sweep gas may be introduced on the shell side 20 of the filtering apparatus 10 at the ports 16 and 18.

Hollow fibers suitable for this invention can be fabricated from various porous materials, including polypropylene, polyvinylidene fluoride, but preferably polysulfone. The fibers preferably have pores sufficiently small (0.02–0.03 microns) to give a molecular weight cut off (MWCO) value of about 50,000. The inside and/or outside of the hollow fibers can be coated with a thin non-porous layer varying in thickness from 0.01–10 microns of an amorphous copolymer of perfluoro-2,2-dimethyl-1,3-dioxole (PDD) and varying amounts of tetrafluoroethylene (TFE). Other fluoropolymers may also be successfully used. Two specific copolymers are TEFLON® AF 2400 TEFLON® AF 1600 available from E.I. du Pont de Nemours and Co, Wilmington, Del. Such coatings are generally used to improve selectivity towards specific gases during gas separations and for oxygen enrichment from air. In the present application, this layer acts as a barrier to the dielectric fluid but is sufficiently permeable towards small molecules, allowing rapid diffusion of gases, moisture and volatile compounds while retaining the dielectric fluid fraction.

The fibers may be coated with any non-porous and gas permeable coating, preferably a fluoropolymers coating. The number of hollow fibers and their dimensions are variable and dictated by their application, but preferably have inner and outer diameters of approximately 400 um×640 um and are of sufficient number to give a total surface area of approximately 4,000 cm$^2$. The hollow fibers are preferably aligned parallel to the length of the cylinder and may be cemented to each other and to the inside of the shell by a bed of cured resin such as polyurethane or epoxy. The ends of the hollow fibers terminate into end caps 30 of the chamber 12, allowing dielectric fluids to flow through the hollow fibers.

The chamber 12 preferably consists of a stainless steel cylindrical shell with two side ports 16 and 18 allowing flow into and out of the shell side 20. The chamber 12 may also be formed of plastic. The dimensions of the shell may vary but preferably define an inner diameter of approximately 4 cm and a length of approximately 25.5 cm. The chamber has been implemented as the CMS-7 gas separation membrane produce sold by Compact Membrane Systems, Inc., Wilmington, Del.

Figure 2:
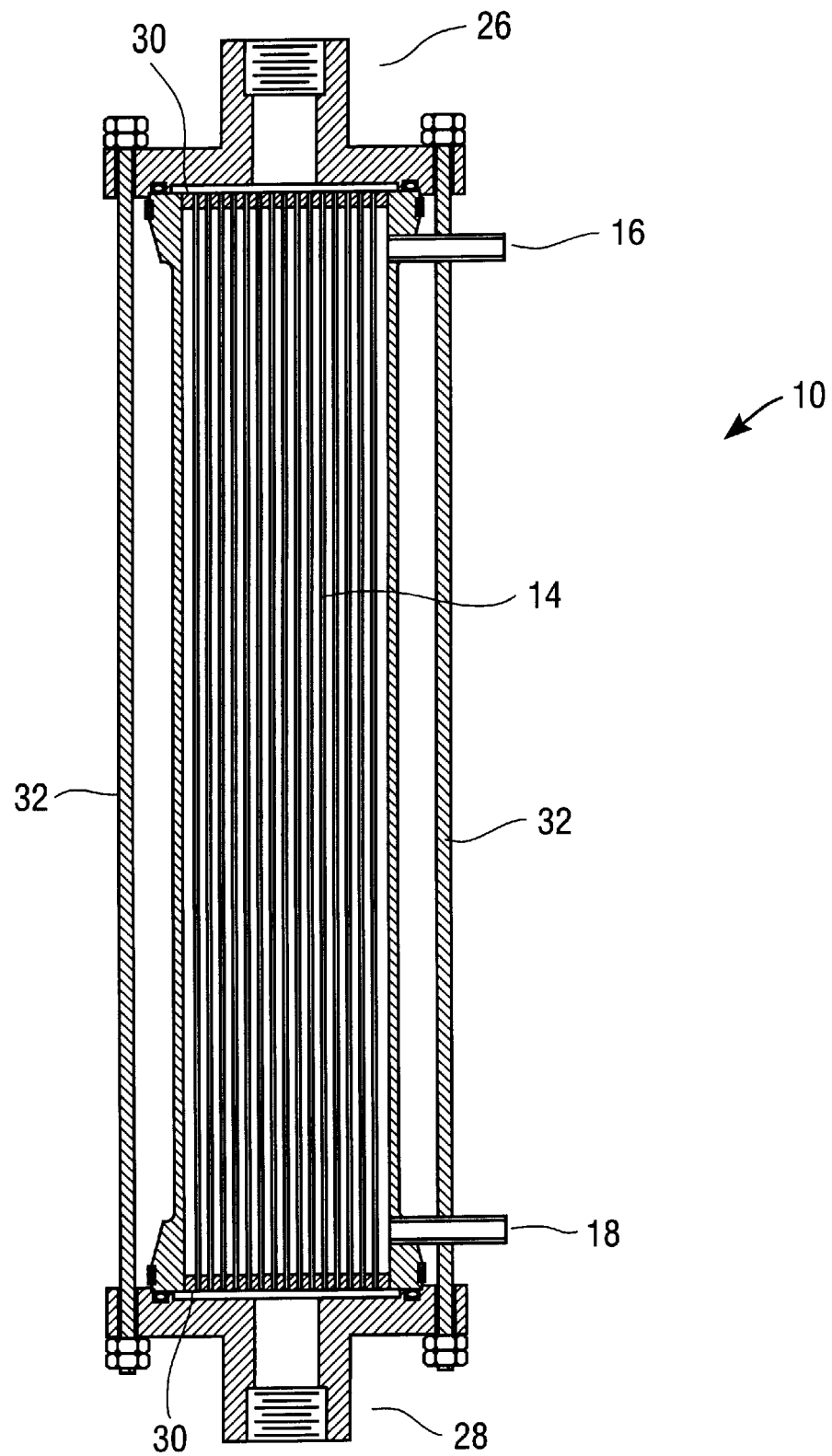
FIG. 2 illustrates a more detailed view of the filtration apparatus of FIG. 1.

FIG. 2 illustrates a more detailed view of the filtration apparatus 10. The shell may be retained between the end caps with steel tie rods 32. This design facilitates ease of mechanical connection to a fluid supply.

Figure 3:
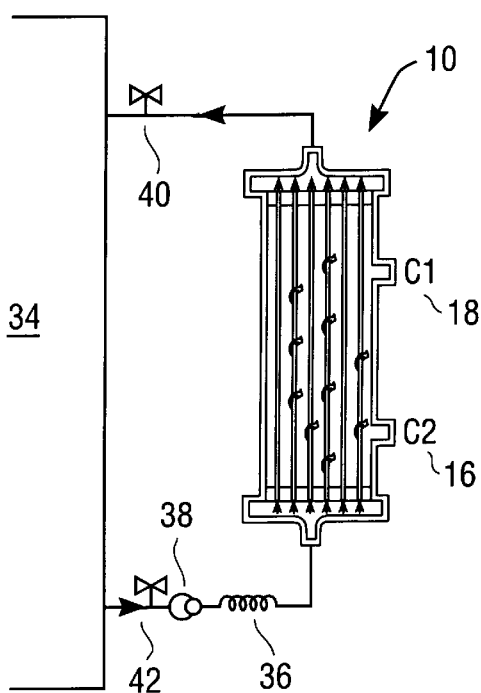
FIG. 3 illustrates the filtration apparatus of FIG. 1, in operative arrangement with a transformer containing dielectric fluid.

FIG. 3 illustrates the filtration apparatus 10 connected to operative equipment in the form of a transformer 34. The dielectric fluid passes through a heating/cooling coil 36, and an optional fluid pump 38. The apparatus preferably also includes valves 40 and 42, to shut off the fluid supply if necessary.

Depending on the type of application desired, gas inlet port 16 and outlet port 18 may be connected to various apparatuses. Connection to gas inlet port 16 and outlet port 18 are designated by the common characters C1 and C2 respectively, throughout FIGS. 3 to 7.

Figure 4:
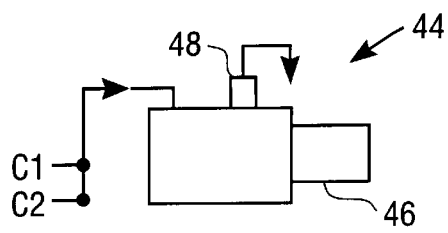
FIG. 4 illustrates a degassing apparatus for use with the filtration apparatus shown in FIG. 3.

FIG. 4 illustrates an apparatus 44 for degassing dielectric fluid within a transformer. A vacuum pump 46 is connected to gas inlet port C2 and outlet port C1. Any contaminants removed from the dielectric fluid are vented through an absorbent trap 48 to atmosphere. In laboratory tests conducted at dielectric fluid flow rates of 100 ml/min, the gas content of the dielectric fluid was reduced from 11% (v/v) to approximately 1% (v/v) after four passes of the dielectric fluid volume. The moisture concentration of the dielectric fluid was also reduced.

Figure 5:
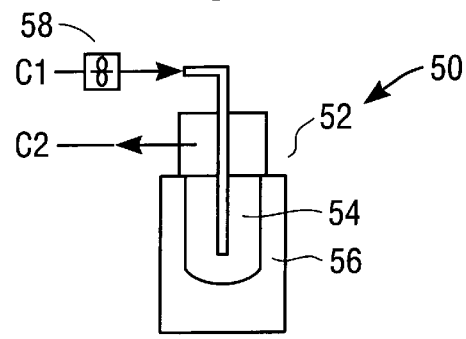
FIG. 5 illustrates a moisture removal apparatus for use with the filtration apparatus shown in FIG. 3.

FIG. 5 illustrates an apparatus 50 for removing moisture from the dielectric fluid. An inlet of a gas recirculating fan 58 is connected to the gas outlet port C1. The outlet of the gas recirculating fan 58 is connected to a cold trap-chiller unit 52. The cold-chiller unit 52 consists of a moisture trap 54 and a chiller 56. The gas is then returned to the gas inlet port C2. In a laboratory experiment simulating transformer overload conditions, the moisture in the dielectric fluid was reduced from 29% relative saturation to 9.6% relative saturation in three days. Typical conditions were: dielectric fluid volume of test chamber=15.5 L, dielectric fluid flow rate through hollow fiber module=approx. 200 ml/min., chiller temperature=−19 C. The trapped liquid was analyzed and found to consist mainly of water. Other compounds identified included: ammonia, acetic acid, and paper decomposition products.

Those skilled in the art will appreciate that other absorbents may be used in accordance with the invention. Absorbents for moisture that may be used in accordance with the invention include: Silica gel, Alumina, Molecular Sieves, Calcium sulfate, Phosphorous pentoxide, Sodium or potassium perchlorate. Scavengers for oxygen that may be utilized in accordance with the invention include: Cuprous oxide, Pyrogallol, Zinc or Aluminum batteries. Molecular sieves or zeolites may be used as oxygen absorbents in connection with the invention.

Figure 6:
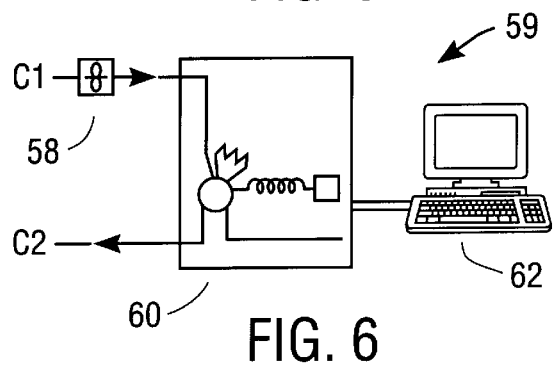
FIG. 6 illustrates an analysis apparatus for use with the filtration apparatus shown in FIG. 3.

FIG. 6 illustrates an apparatus 59 for analyzing the gas removed from the dielectric fluid. The gas ports C1 and C2 are connected directly to a gas chromatograph 60 in a closed loop system. An optional circulating pump 58 may be used to speed up the transfer of the gases, moisture and volatile compounds. Gas chromatography is a process whereby a gas is separated into its component parts as a result of the differential distribution of dissolved particles present in the gas as they flow around or over a stationary liquid or solid phase. The results may be analyzed by a computer 62 which is connected to the gas chromatograph 60. This arrangement provides the added advantage of minimizing the consumption of sample volume per analysis. In a separate experiment, the gas ports C1 and C2 were sealed with rubber septa and the dielectric fluid flow controlled at 50 ml/min. The composition of the gas in the shell side was monitored by gas chromatography. Results showed that under these conditions dissolved gases from the dielectric fluid migrated to the shell side and reached equilibrium in approximately 30 minutes. The equilibrium concentrations were within 90% of the theoretical values as calculated using published Ostwald solubility coefficients. Other products detected were: moisture and volatile compounds including ammonia, acetone, and paper decomposition products. The contents of the chamber may also be analyzed by means other than gas chromatography. The analysis may occur either at an extractor location, such as for example near the transformer, or at an off-site laboratory. The sample may furthermore be extracted by other means such as by syringe, compressor pump, vacuum pump, natural feed or gravity feed.

Figure 7:
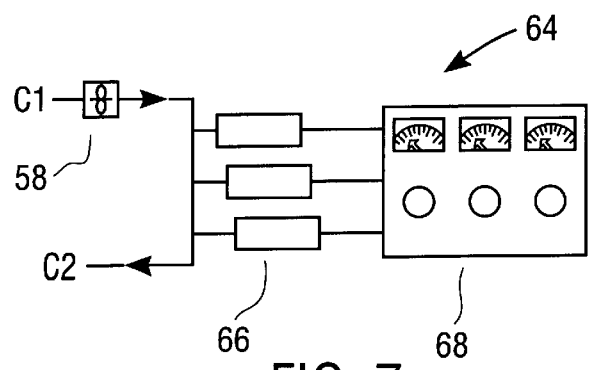
FIG. 7 illustrates a monitoring apparatus for use with the filtration apparatus shown in FIG. 3.

FIG. 7 illustrates an apparatus 64 for monitoring the content of the gas removed from the dielectric fluid. The gas ports C1 and C2 are connected directly to sensors 66 in a closed loop system. In one embodiment, the sensors are silicon-based solid state sensors configured to detect selected contaminants. An optional circulating pump 58 may be used to speed up the transfer of the gases, moisture and volatile compounds. An output apparatus 68 is connected to the sensors 66 to analyze and monitor the results from the sensors 66. In laboratory experiments using this arrangement, the presence of ammonia and moisture with a commercially available ammonia sensor and hygrometer were monitored. These compounds may also be detected with commercially available detector tubes.

Figure 8:
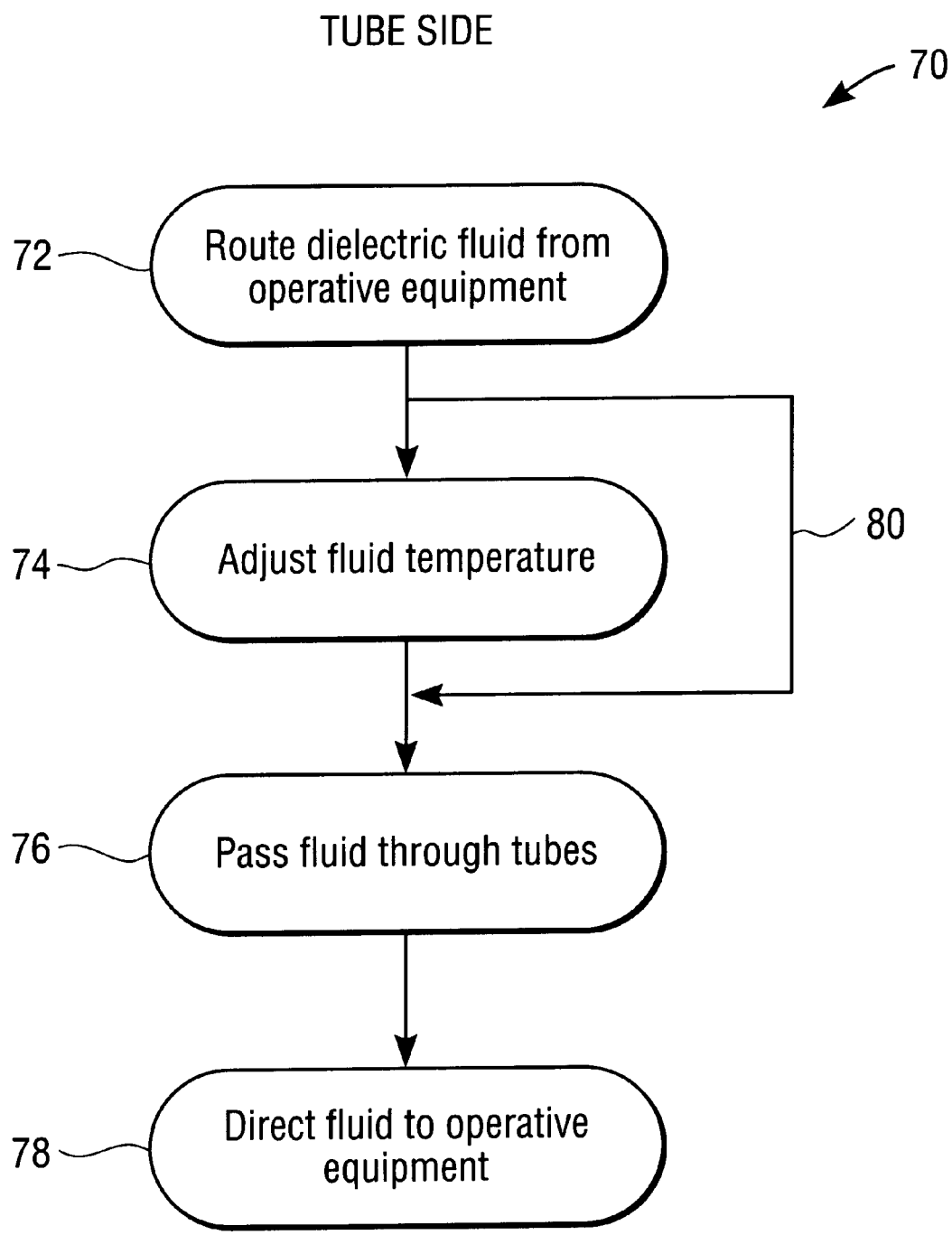
FIG. 8 illustrates a flow chart showing tube side processing in accordance with an embodiment of the invention.

FIG. 8 illustrates a flow chart of a method of the invention. In particular, the figure illustrates a tube side fluid filtration process 70 for a dielectric fluid used in operative equipment. The method utilizes the apparatuses described above. Dielectric fluid, such as transformer oil, is routed 72 from a piece of operative equipment, such as an electric transformer, to a fluid filtration apparatus. The routing step may be accomplished either by natural forces such as gravity or heat convection, or by means of a pump. The temperature of the dielectric fluid may then be adjusted 74 by utilizing the heating/cooling coil. If desired, the temperature adjustment step may be skipped 80. The dielectric fluid is then passes 76 through a plurality of tubes including porous hollow fibers coated with an inert polymer. As discussed above, this results in contaminants being removed from the dielectric fluid. The dielectric fluid can therefore be considered a refined dielectric fluid. The refined dielectric fluid is then returned to the operative equipment 78.

Figure 9:
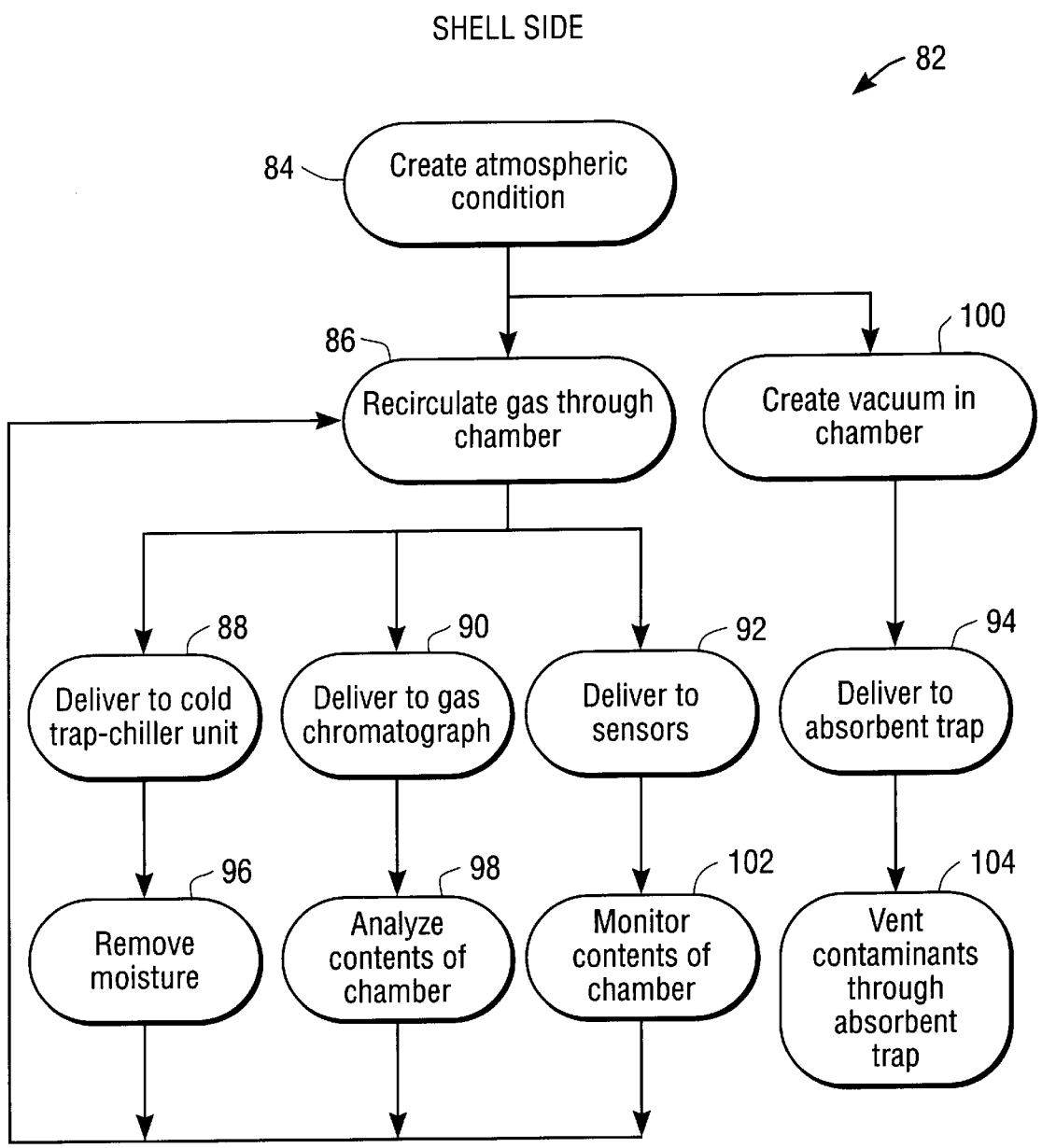
FIG. 9 illustrates a flow chart showing shell side processing in accordance with an embodiment of the invention.

FIG. 9 illustrates a flow chart of the above method, illustrating 82 the shell side of the dielectric fluid filtration process. An atmospheric condition is created 84 in the chamber. The atmospheric condition could include recirculating the contents of the chamber 86 or creating a vacuum in the chamber 100. If a vacuum is created 100, the contents of the chamber are then delivered to an absorbent trap 94, and thereafter vented to atmosphere 104. The contents of the chamber may be recirculated 86 through the chamber by means of the gas circulation fan. The gas circulation fan delivers the gas contents of the chamber to individual apparatuses, or to a combination of various apparatuses, depending on the desired application. The gas may be delivered to the cold trap-chiller unit 88, which removed 96 any vapor present within the gas by condensing the gas. The gas may also be delivered to the gas chromatograph 90, which analyzes 98 the contents of the gas. Furthermore, the gas may additionally be delivered to the solid state sensors 92, which monitor 102 the gas to determine its properties.

The moisture removal 96, chromatograph analysis 98 or sensor monitoring 102 processes, may occur singularly or in combination with one another. For example, the dielectric fluid may be purified of gases, moisture or volatile products present therein, and these impurities may continuously be monitored to determine the condition of the transformer. The entire process may also be conducted while the transformer is on-line or in use.

One skilled in the art will appreciate that the present invention is distinguishable over the closest prior art, for the following reasons. U.S. Pat. No. 4,437,082 does not disclose a chamber enclosing a plurality of tubes. The chamber and tube configuration of the present invention is highly effective in removing contaminants from dielectric fluids as a proportionately large amount of the dielectric fluid is exposed to the gas permeable polymer of the filtration apparatus.

Although U.S. Pat. No. 5,914,154 discloses a similar chamber and tube configuration incorporating a permeable membrane, its purpose is to purify a gas by removing impurities present in the gas. The present invention however, makes use of a chamber and tube configuration to continuously remove and monitor any contaminants present in a dielectric fluid.

Furthermore, commercially available fluid degassing apparatuses, such as that disclosed in U.S. Pat. No. 4,986,837, are not suitable for degassing dielectric fluids, such as oils. Dielectric fluid "wet" the filter mechanisms used, making them inadequate for further use.

Those skilled in the art will recognize that the invention is particularly useful when used to remove contaminants in the form of dissolved oxygen from an insulating oil within a transformer. Dissolved oxygen is known to accelerate aging of the insulating paper of a transformer. Therefore, by removing dissolved oxygen in accordance with the invention, the invention operates to extend the life of insulating paper within a transformer.

The invention has been described in connection with dielectric fluids used in operative equipment. Those skilled in the art will appreciate that the invention can also be exploited in connection with non-dielectric fluids that are used in operative equipment, such as hydraulic equipment and turbines. Other variations of the disclosed invention include the use of solid state sensors in the shell side 20 of the chamber 12.

The foregoing descriptions of specific embodiments of the present invention are presented for purposes of illustration and description only. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of removing contaminants from operative equipment that relies upon a dielectric fluid, said method comprising the steps of:

routing a dielectric fluid from operative equipment;

passing said dielectric fluid through a plurality of tubes enclosed within a chamber, each tube of said plurality of tubes including a porous hollow fiber with an inert polymer coating;

creating an atmospheric condition within said chamber to force contaminants within said dielectric fluid to migrate through said plurality of tubes into said chamber, thereby producing refined dielectric fluid; and directing said refined dielectric fluid from said plurality of tubes to said operative equipment.

2. The method of claim 1 wherein said creating step includes the step of creating an atmospheric condition within said chamber to force dissolved oxygen within transformer oil to migrate through said plurality of tubes into said chamber, thereby producing refined transformer oil.

3. The method of claim 1 wherein said creating step includes the step of forming a vacuum state within said chamber.

4. The method of claim 2 wherein said forming step further includes the steps of:

delivering the contents of said chamber to an absorbent trap; and venting said contents through said absorbent trap to atmosphere.

5. The method of claim 1 wherein said creating step includes the step of recirculating gas through said chamber.

6. The method of claim 5 further comprising the steps of:

delivering said recirculating gas to a chilling cell; and removing any vapor present within said gas by condensing said gas.

7. The method of claim 5 further comprising the steps of:

delivering said recirculating gas to gas chromatographic equipment; and analyzing said gas to determine constituent parts of said gas.

8. The method of claim 5 further comprising the steps of:

delivering said recirculating gas to at least one solid state sensor; and monitoring said gas to determine its properties.

9. The method of claim 1 further comprising the steps of altering the temperature of said dielectric fluid prior to said passing step.

10. An apparatus to remove contaminants from a dielectric fluid, comprising:

operative equipment enclosing said dielectric fluid;

a chamber enclosing a plurality of tubes, each tube of said plurality of tubes including a porous hollow fiber with an inert polymer coating;

a first conduit to route said dielectric fluid to said chamber;

an atmosphere control device to create an atmospheric condition within said chamber that forces contaminants within said dielectric fluid to migrate through said plurality of tubes into said chamber, thereby producing refined dielectric fluid; and a second conduit to route said refined dielectric fluid from said plurality of tubes to said operative equipment.

11. The apparatus of claim 10 wherein said atmospheric control device removes dissolved oxygen from a transformer oil to produce a refined transformer oil.

12. The apparatus of claim 10 wherein said atmospheric control device is a vacuum pump.

13. The apparatus of claim 10 wherein said atmospheric control device is a gas recirculating fan configured to produce recirculating gas with said chamber.

14. The apparatus of claim 13 further comprising a chilling cell connected to said chamber, said chilling cell causing vapor within said recirculating gas to condense within said chilling cell.

15. The apparatus of claim 13 further comprising gas chromatographic equipment connected to said chamber, said gas chromatographic equipment being configured to analyze said recirculating gas.

16. The apparatus of claim 13 further comprising a solid state sensor connected to said chamber, said solid state sensor being configured to monitor said recirculating gas.

17. The apparatus of claim 10 further comprising a coil connected to said first conduit to alter the temperature of said dielectric fluid.

18. The apparatus of claim 10 wherein said operative equipment is selected from the group consisting of: transformers, load tap changers, hydraulic equipment, and turbines.

* * * * *